(12) United States Patent
Zimmermann et al.

(10) Patent No.: US 6,517,226 B1
(45) Date of Patent: Feb. 11, 2003

(54) INTERIOR ILLUMINATION SYSTEM FOR VEHICLES, IN PARTICULAR, MOTOR VEHICLES

(75) Inventors: Werner Zimmermann, Ottenbach (DE); Dag Wagner, Palzern (DE)

(73) Assignee: Reitter & Schefenacker GmbH & Co. KG, Esslingen (DE)

( * ) Notice: Subject to any disclaimer, the term of this patent is extended or adjusted under 35 U.S.C. 154(b) by 0 days.

(21) Appl. No.: 09/574,336

(22) Filed: May 19, 2000

(30) Foreign Application Priority Data

May 21, 1999 (DE) ..................... 299 08 994 U

(51) Int. Cl.[7] ................................................ B60Q 1/00
(52) U.S. Cl. .................. 362/488; 362/84; 362/490; 362/231; 313/512
(58) Field of Search ...................... 362/84, 488, 490, 362/231; 313/512

(56) References Cited

U.S. PATENT DOCUMENTS

| 4,494,326 | A | * | 1/1985 | Kanamori ................. 362/84 X |
| 4,864,473 | A | * | 9/1989 | Tokarz ........................ 362/84 |
| 5,013,967 | A | * | 5/1991 | Hirotaka et al. ............ 313/512 |
| 5,566,384 | A | * | 10/1996 | Chien .......................... 362/84 |
| 5,641,221 | A | * | 6/1997 | Schindele et al. ........ 362/84 X |
| 5,667,394 | A | * | 9/1997 | Chien .......................... 313/512 |

* cited by examiner

*Primary Examiner*—Stephen Husar
(74) *Attorney, Agent, or Firm*—Gudrun E. Huckett

(57) ABSTRACT

An interior illumination system for a motor vehicle has one or more luminous fields formed by at least one light emitting, foil-shaped illumination panel connected to a voltage supply of the vehicle. The light emitting, foil-shaped illumination panel is made of by an electroluminescent foil or a light-emitting polymer foil. The illumination panels can be fastened to the roof, columns, and dashboard of the vehicle and are adjustable with respect to intensity as well as color and hues of the emitted light.

31 Claims, 5 Drawing Sheets

INTERIOR ILLUMINATION SYSTEM FOR VEHICLES, IN PARTICULAR, MOTOR VEHICLES

BACKGROUND OF THE INVENTION

1. Field of the Invention

The invention relates to an interior illumination system for vehicles, preferably motor vehicles, with at least one luminous field connected to a voltage supply of the vehicle.

2. Description of the Related Art

In known interior illumination systems incandescent light bulbs are provided which are positioned behind transparent panes of glass or plastic. The installation of such luminous fields requires a considerable expenditure because mounting openings for snapping into place or screwing into place light housings must be provided in the vehicle.

SUMMARY OF THE INVENTION

It is an object of the present invention to configure the interior illumination system of the aforementioned kind such that it can be installed simply and inexpensively in the vehicle interior, e.g., the passenger compartment.

In accordance with the present invention, this is achieved in that the luminous field is formed by at least one foil-like, light-emitting illumination panel.

In the inventive interior illumination system the luminous field has at least one foil-like, light-emitting illumination panel. It can be mounted simply and inexpensively at any desired location within the vehicle interior because of its foil-like design. Complicated or complex mounting openings and recesses within the vehicle are no longer required. Such illumination panels can, for example, be directly glued on so that the mounting expenditure is extremely minimal.

DESCRIPTION OF THE PREFERRED EMBODIMENTS

Figure 1:
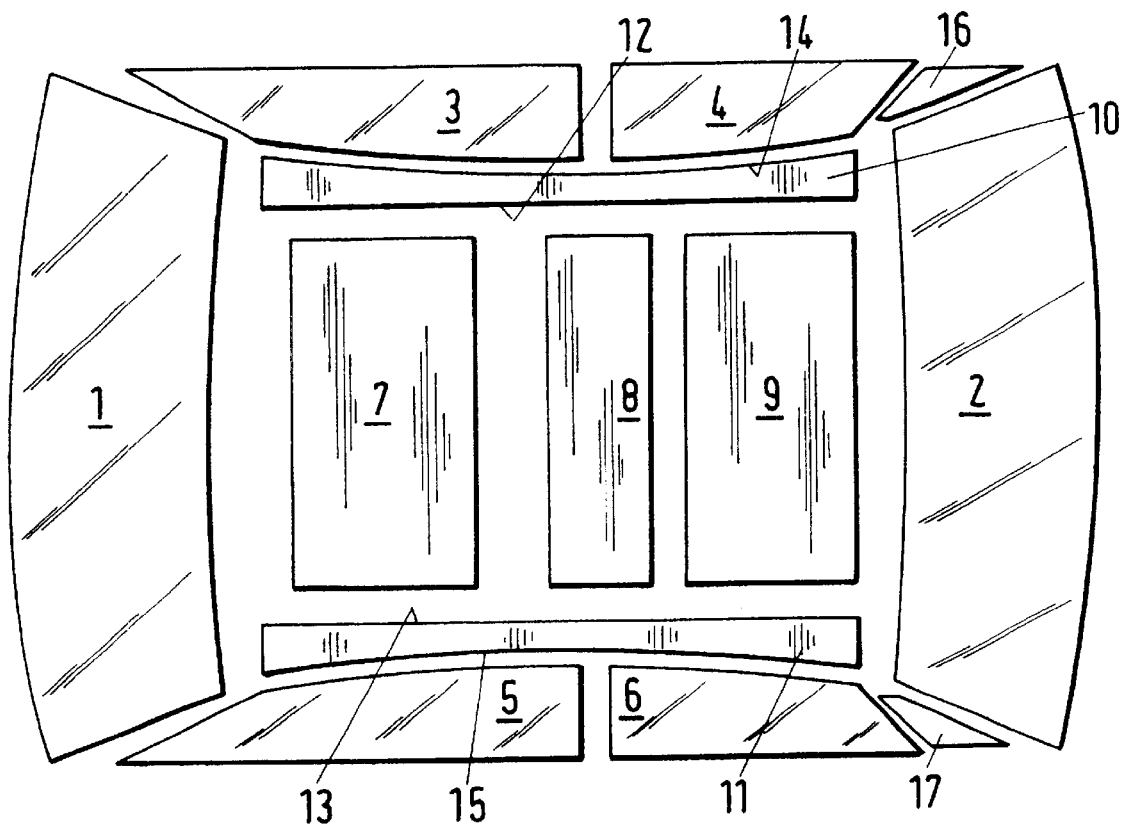
FIG. 1 shows in a schematic representation the luminous fields of the inventive interior illumination system of a motor vehicle.
Figure 2:
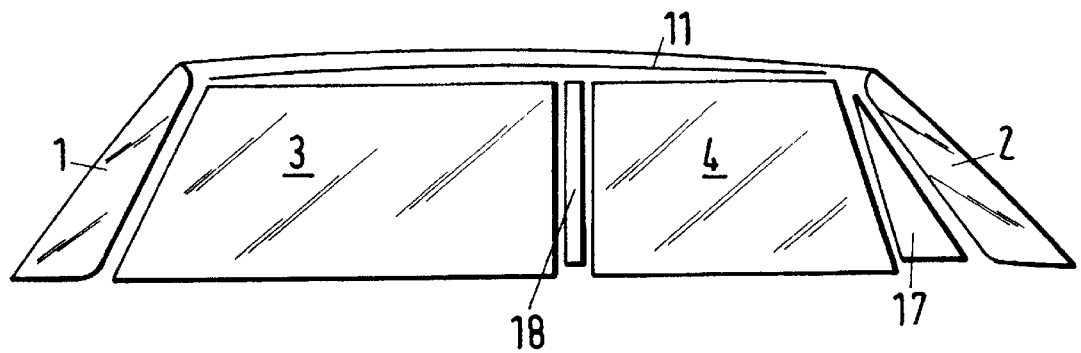
FIG. 2 shows in a schematic representation a side view of the luminous fields of the interior illumination system according to the invention as shown in FIG. 1.

The FIGS. 1 and 2 show an interior illumination system of a motor vehicle having a windshield 1, a rear window 2, and side windows 3 through 6. Between the windshield 1 and the rear window 2, three luminous fields 7 through 9 are positioned which are spaced from one another and have a rectangular contour. In the shown embodiment, the luminous fields 7, 9, positioned adjacent to the windshield 1 and the rear window 2, respectively, are of identical size while the luminous field 8 between them has a smaller surface area. Viewed in a direction transverse to the longitudinal direction of the vehicle, the luminous fields 7 through 9 have identical length.

Luminous fields 10, 11 are positioned respectively in the area between the side windows 3,4;5,6 and the luminous fields 7 through 9 and are spaced from the luminous fields 7 through 9 and the side windows 3, 4; 5, 6 as well as the windshield 1 and the rear window 2. The two luminous fields 10, 11 are of an elongate shape and have a straight longitudinal side 12, 13 facing the central luminous fields 7 through 9 and extending parallel to the neighboring narrow sides of the luminous fields 7 through 9. The oppositely positioned longitudinal edge 14, 15 of the luminous fields 11, 12 is matched to the contour of the neighboring edges of the side windows 3 through 6. Advantageously, the longitudinal edges 14, 15 extend parallel to the neighboring edges of the side windows 3 through 6. The ends of the luminous fields 11, 12 facing the rear window 2 are positioned at the same level as the longitudinal edge of the luminous fields 9 facing the rear window 2. In the direction toward the windshield 1 the narrow luminous fields 10, 11 project past the luminous field 7.

Advantageously, a luminous field 16, 17 is provided in the area between the rear window 2 and the neighboring side windows 4, 6, respectively. Both luminous fields 16, 17 are advantageously of identical design and have a triangular shape (FIG. 2).

As shown in FIG. 2, it is also possible to provide between neighboring side windows 3 and 4 or 5 and 6 narrow luminous fields 18 extending over the height of the side windows 3 through 6.

In FIGS. 1 and 2, only an exemplary arrangement and distribution of the different luminous fields is represented. Of course, the luminous fields can also have a completely different shape. Also, it is, of course, possible to distribute the luminous fields within the interior of the vehicle in other arrangements.

It is possible to provide all columns, but also the inner side panels of the doors, the dashboard, the center console or other areas in the interior of the vehicle with luminous fields.

The luminous fields 7 through 12, 16 through 18 are illuminated over their entire surface area when a corresponding current is supplied to the luminous fields. Due to the areal illumination (surface area illumination) a comfortable lighting is achieved in the vehicle interior. The luminous fields can emit light of the same color hue but also of different color hues. The luminous fields 7 through 9 are provided in the area of the vehicle roof. Instead of the three individual luminous fields 7 through 9 it also possible to provide a single luminous field that extends over the entire surface area of the roof. This means that the entire passenger compartment is uniformly illuminated. It is also possible to illuminate only the front seats are only the back seats of the vehicle. In this case, the corresponding luminous fields are provided only in the forward or the rearward portion of the roof of the vehicle interior. The luminous fields 16, 17 provided between the rear window 2 and the neighboring side windows 4, 6 contribute to an optimal illumination in the area of the back seats of the vehicle because, in addition to the luminous fields on the roof, light is also projected laterally onto the back seat area.

Figure 6:
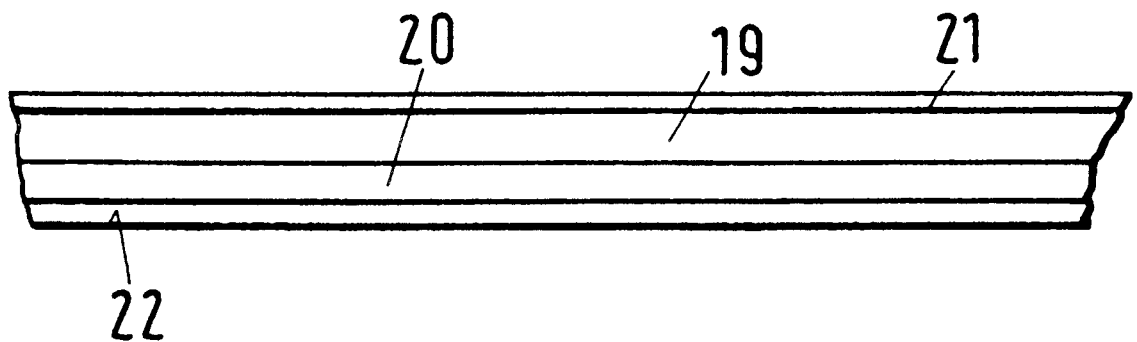
FIG. 6 is a schematic section representation of an electroluminescent foil for the interior illumination system according to the invention.

The luminous fields 7 through 11, 16 through 18 are comprised of an electroluminescent foil 19 (FIG. 6) having a protective layer 20 at the side facing the interior of the vehicle. The protective layer 20 is also of a foil-like configuration and provides a mechanical and electrical protection for the electroluminescent foil 19. On the opposite side of the foil 19 a second protective layer 21, also foil-like, is advantageously positioned and also serves as a mechanical and electrical protection. The electroluminescent foil is comprised of a front electrode and a back electrode which are separated from one another by an insulation. The front electrode which faces the protective layer 20 is transparent while the back electrode which faces the protective layer 21 is of a non-transparent material. The protective layers 20, 21 can be formed of plastic foil or of glass. Especially in the protective layer 20 facing the vehicle interior it is possible to insert printed designs or covers. Between the two electrodes of the electroluminescent foil 19 a luminous substance (phosphor) is embedded which emits light when voltage is supplied to the two electrodes. Since the back electrode is non-transparent, the light is thus guided into the vehicle interior through the protective layer 20. Advantageously, the luminous field is positioned behind a lining 22 of the vehicle interior. The lining is transparent so that the light emitted by the luminous field can pass through the lining 22 into the vehicle interior. The lining 22, which is made of textile material but can also be made of (foamed) plastic, covers the luminous field 7 through 11, 16 through 18 advantageously such that in the switched-off state the luminous fields are invisible.

Since the electrodes of the electroluminescent foil 19 extend across the surface area of the luminous field, the foil-like blank material for the luminous fields 7 through 11, 16 through 18 can be cut to any desired shape or contour.

The protective layer 21 can be formed such that it is self-adhesive at its backside so that the respective luminous field can be glued in a simple manner to surfaces of the vehicle interior. The protective layer 20 facing the interior of the vehicle can have any desired surface texture or finish, for example, it can have a matte finish: or a desired color hue. The different layers of the foil-like luminous fields are laminated. The thickness of a luminous field is in the magnitude of 2×0.075 mm up to approximately 2×0.25 mm. Due to this minimal thickness the luminous fields 7 through 11, 16 through 18 require hardly any space so that the installation can be carried out without problems at any desired location within the vehicle interior. Depending on the luminous substance (phosphor) which is located between the two electrodes of the electroluminescent foil 19, different colors can be provided for the luminous fields.

The electroluminescent effect of the foil 19 is generated by an alternating voltage field. By changing the voltage, the light intensity of the luminous fields 7 through 11, 16 through 18 can be controlled. Moreover, by changing the frequency, the color temperature point can be shifted.

Figure 3:
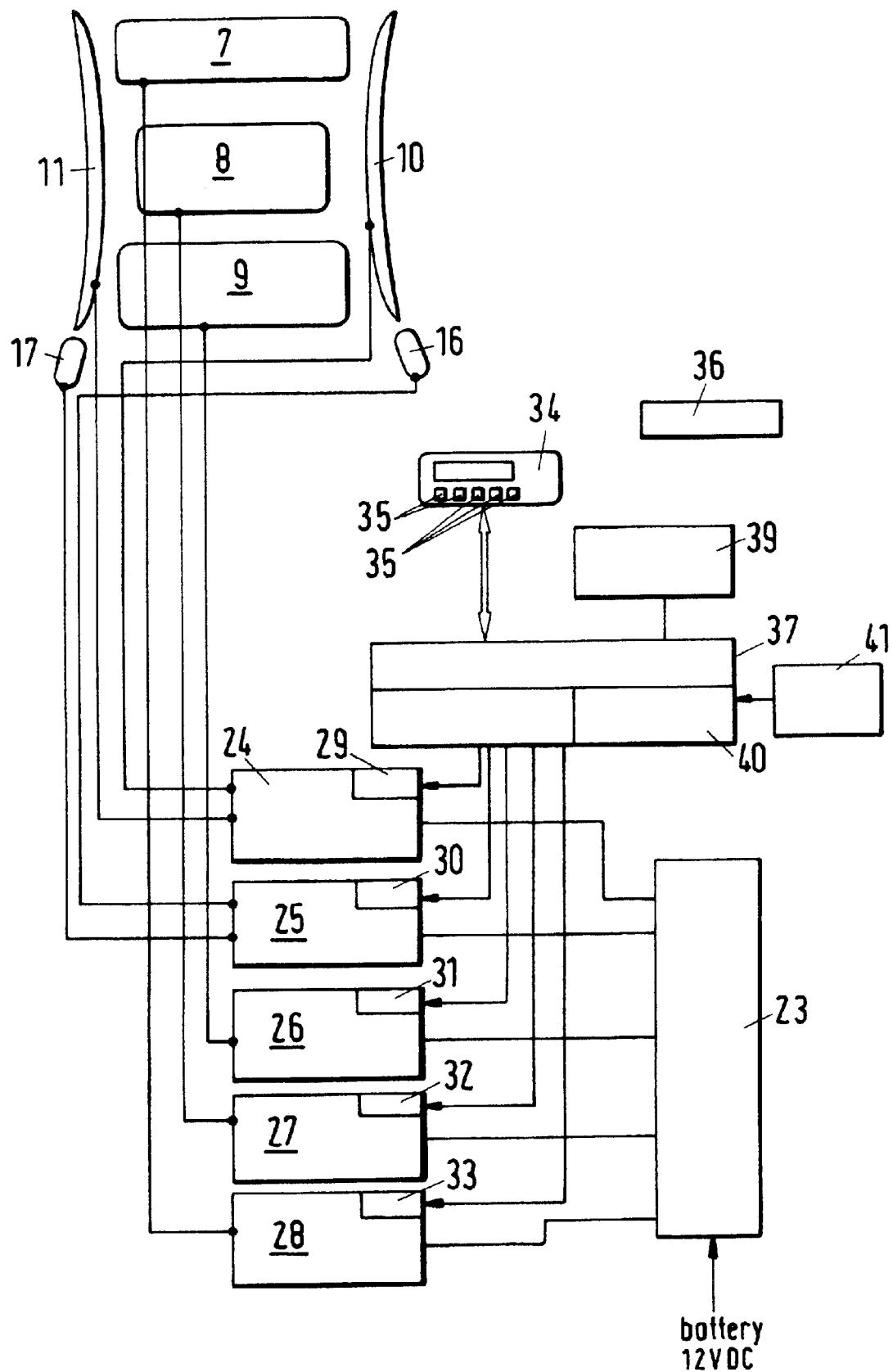
FIG. 3 is a circuit diagram of a light intensity control of the interior illumination system according to the invention.

FIG. 3 shows an embodiment for the voltage supply of the luminous fields. The vehicle battery, which is conventionally operated with 12 V direct current, has arranged downstream thereof a DC/AC converter 23 which converts the direct current supplied by the battery into alternating current. Auxiliary converters 24 through 28 are correlated with the luminous fields 7 through 11, 16, 17 and are connected to the DC/AC converter 23. Each of the converters 24 through 28 operates, for example, with a voltage of 120 V and a frequency of 400 Hz. The converters 24 through 28 are advantageously provided with dimmers 29 through 33 so that the light intensity of the luminous fields can be regulated in a simple way.

By means of an input device 34 which is arranged advantageously within reach of the driver, the respective luminous fields 7 through 11, 16, 17 can be switch on or off by using respective keys 35. The keys 35 can be foil keys but also conventional push buttons. The input device 34 can advantageously be programmed by a computer 36. The signals emitted by the input device 34 are sent to a computer 37 which, in the represented embodiment, has five analog terminals 38 by which the converters 24 through 28 can be supplied with a control voltage. For example, the control voltage can be in the range of between 0 and 10 V. The control current can be, for example, 10 mA.

The computer 37 is connected by means of the DC/AC converter 23 or by a further DC/AC converter 39 to the vehicle battery.

The computer 37 is furthermore provided with a digital terminal 40 which operates, for example, at 5 V. Instead of the digital terminal an analog terminal may be provided. Also, it is possible to employ instead of the digital terminal at least one sensor via which the computer 37 can be operated remotely, for example, by a transmitter of a door opener 41. Such a sensor, however, can also be configured such that it responds to the surrounding light intensity. As soon as the surrounding light intensity falls below a predetermined value, the interior illumination of the vehicle is automatically switched on. This sensor can moreover be designed such that, upon surpassing this preadjusted light intensity value, the interior illumination is automatically switched off.

Figure 4:
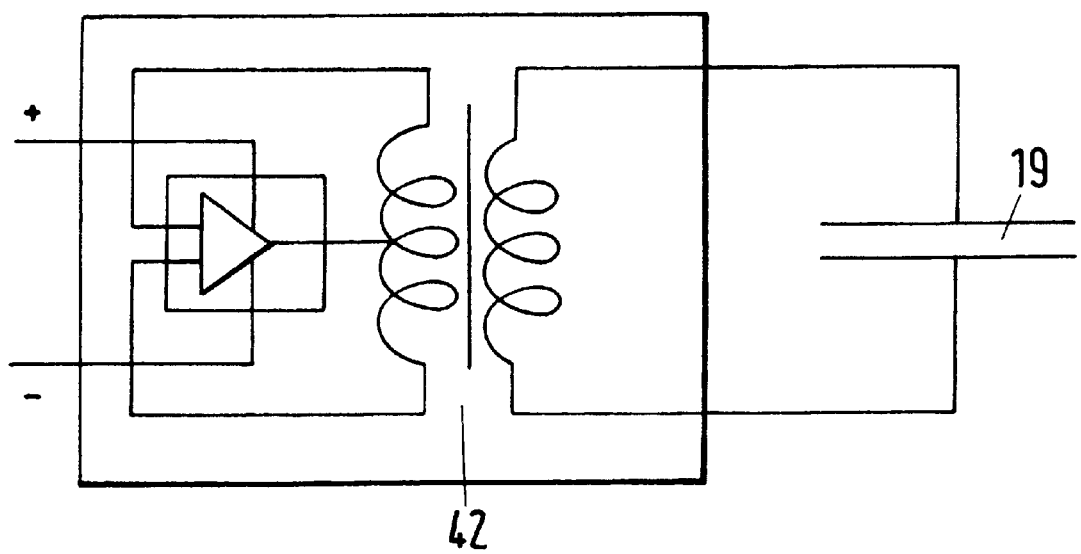
FIG. 4 is an example of a circuit diagram of the converter of the light intensity control according to FIG. 3.

The converters 24 through 28 can be passive or active converters. FIG. 4 shows an example of a passive converter. It has an oscillator 42 with which a direct voltage supply of the primary side is converted into a sinusoidal alternating voltage at the secondary side. The electroluminescent foil 19 is the capacitor that tunes the oscillator 42 on the secondary side. The voltage and frequency change as a function of the size of the respective luminous field 7 through 11, 16 through 18. Such passive converters generate with the aid of the oscillator 42 a frequency with a sufficient voltage. Such converters are suitable for a large supply voltage range.

Figure 5:
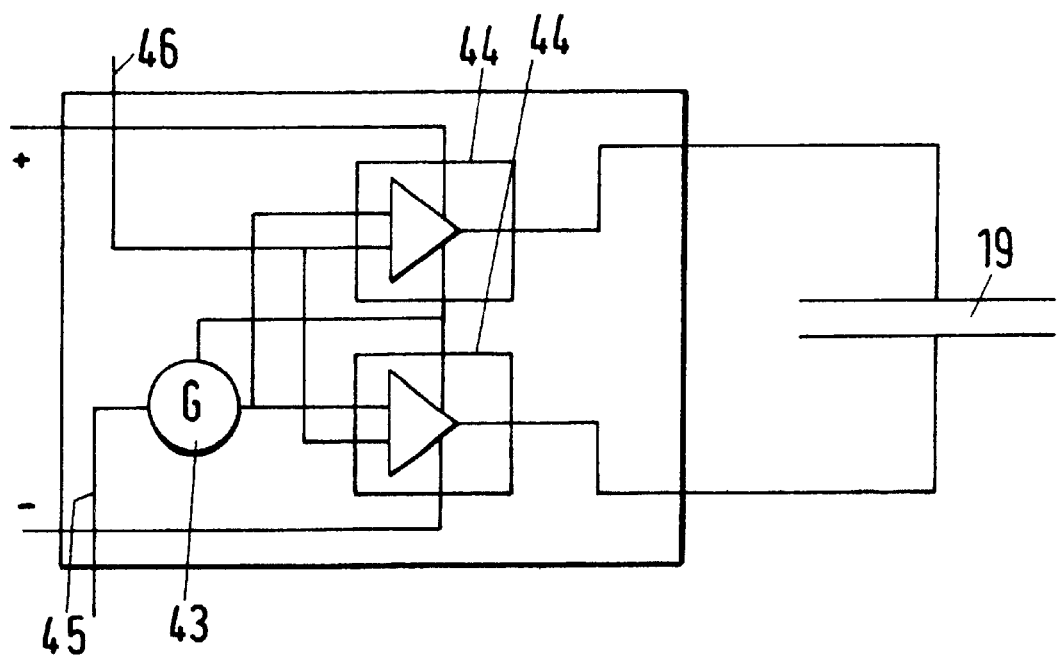
FIG. 5 is a further embodiment of a circuit diagram of the converter for the light intensity control according to FIG. 3

Is also possible to employ active converters as converters 24 through 28 (FIG. 5). An active converter generates the frequency and the voltage by means of a generator 43, wherein voltage and frequency remain stable over the entire supply voltage range. In these active converters, a pulse width modulated signal is converted into a digital sinusoidal excitation and is supplied to the terminal of a power stage after digital/analog conversion. Downstream thereof a step-up transformer for the voltage which drives the electroluminescent foil 19 is provided. At the secondary side the voltage is tapped for control purposes, rectified, and supplied as the actual value to a control circuit 44. The dimming (FIG. 3) is realized by pulse width modulation. The external control signal 45, which is between 0 and up to 10 V for direct current, is multiplied by the degree of modulation (pulse width ratio) of the pulse width modulation signal. The result is then digitalized as a set (nominal) value and supplied to the sinusoidal generation. The power stage is also supplied with a control signal 46.

The luminous fields 7 through 11, 16 through 18 can be embodied such that the light emitted by them does not correspond to the illumination color in the switched-off state. For example, the luminous fields can emit red light, but in the switched-off state can have, for example, a gray color. Such an embodiment of the luminous fields has the advantage that they cannot be seen within the vehicle interior in the switched-off state.

The luminous fields can also be embodied such that the luminous foil 19 is enriched with daylight pigments. The luminous fields then have the same color hue in the switched-on and in the switched-off state. Such luminous fields can be deliberately designed to have a certain color in order to be integrated into the interior design of the vehicle. Both kinds of luminous fields can be used, depending on the desired application purpose, in the vehicle interior.

Since the foil-shaped luminous fields have only a very minimal thickness, they can be, for example, also fastened to the underside of vehicle sun roofs. For example, the luminous field 7 according to FIG. 1 can be fastened to the underside of a sun roof. When the sun roof is closed, this area of the vehicle roof can be used for illumination purposes of the vehicle interior.

Instead of the described electroluminescent foil, the illumination panel can also be in the form of a light-emitting polymer foil. Such polymer foils require only a minimal operation voltage required within the magnitude of approximately 2 volt.

In the described embodiments the different luminous fields have a uniform color hue. Depending on the luminous material (phosphor) which is arranged between the two electrodes of the electroluminescent foil 19, different color hues can be produced. By changing the frequency it is also possible to shift the color temperature point so that a minimal change of the color temperature is possible.

Figure 7:
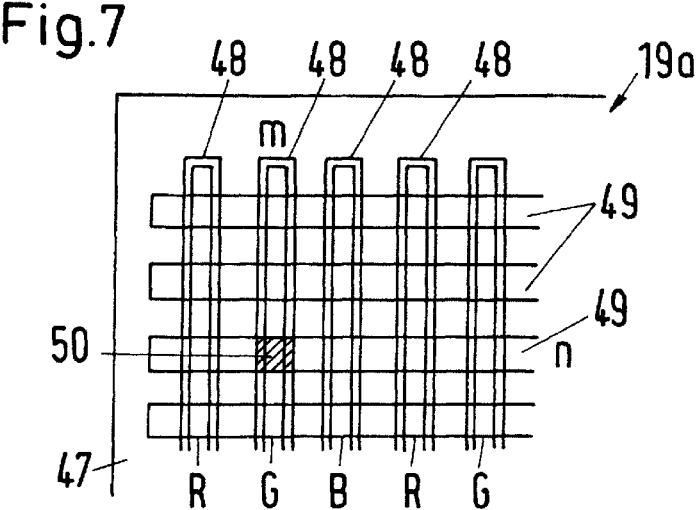
FIG. 7 is a schematic representation of a second embodiment of an electroluminescent foil of the interior illumination system according to the invention.

FIG. 7 shows a possibility to change the color hue of the luminous fields in the vehicle as desired, depending on the wishes of the passengers. For this purpose, an electroluminescent foil 19a is used which has a foil-like support 47 for front electrodes 48 and back electrodes 49 as well as for different luminous substances R, G, B. Layers of the luminous substances which are comprised of phosphor colors are printed as fields (R, G, B) alternatingly onto the front electrodes 48 positioned on the foil support 47. The front and back electrodes 48, 49 are printed onto the foil support 47 in a right angle crossed arrangement. Depending on which ones of the front and back electrode rows are triggered, corresponding color points 50 will be illuminated. In FIG. 7, an example is illustrated showing the front electrodes 48m and the back electrode 49n being triggered. Accordingly, the color point 50 is illuminated. Depending on the selection of the electrodes 48, 49 to be triggered, different color points can be illuminated. Since the color points are designed to produce different colors R (red), G (green) and B (blue), it is possible to select the color hue when switching on the respective luminous field.

When an electroluminescent foil is used for the luminous field, the electrodes 48, 49 are separated from one another by an insulation. However, when a light-emitting polymer foil is used for the luminous field, an insulation between the electrodes can be eliminated.

Figure 8:
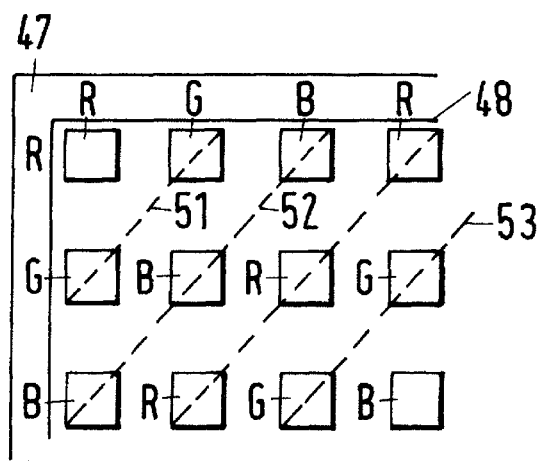
FIG. 8 shows in a representation corresponding to FIG. 7 a further embodiment of an electroluminescent foil of the interior illumination system according to the invention.

FIG. 8 shows in an exemplary manner that the luminous substances R, G, B are no longer strip-shaped but are printed in the form of discrete luminous substance fields or dots onto the front electrode 48. The front electrode 48, in contrast to the embodiment of FIG. 7, is no longer strip-shaped but has an areal (sheet or web-like) configuration arranged on the foil support 47. The color fields or dots R, G, B are printed onto this front electrode 48. A back electrode 49 is provided on each color dot R, G, B, advantageously in a congruent arrangement relative to the color dots. The color dots have differently colored phosphor colors. An insulation is provided between the color dots R, G, B and the back electrodes 49 and is advantageously formed areally as a sheet or web extending across all of the color dots. However, the insulator can also be applied according to the pattern of the colored dots. As schematically illustrated in FIG. 8, the color dots R, G, B of identical color are connected to one another by a common electrical line 51, 52, 53.

Figure 9:
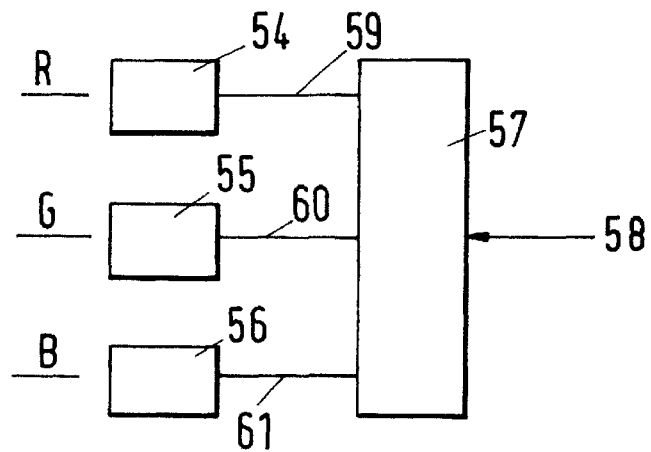
FIG. 9 is a schematic representation of a circuit diagram for the interior illumination system according to FIGS. 7 and 8.

FIG. 9 shows in an exemplary manner how the color hue of the luminous fields can be changed continuously from red to blue via white. For this purpose, three converters 54 through 56, correlated with the color fields R, G, B, are triggered. The converters 54 through 56 are connected to a mixer 57 which, according to the desired color hue of the respective luminous field, sends pulse width modulated signals 59 through 61 to the converters 54 to 56. The converters 54 through 56 can be embodied in accordance with the previous embodiment and can be active or passive converters. By means of the converters 54 through 56, the respective electrodes 48, 49 are triggered so that the desired color fields R, G, B are illuminated. At the input terminal of the mixer 57, an input signal 58 is received that is initiated by the passenger or driver of the vehicle. For example, on the dashboard of the vehicle a turn knob (switch) may be provided and by turning it the desired color hue of the illuminated luminous fields can be adjusted. Depending on the position of this switch, the converters 54 through 56 are triggered in a corresponding ratio by means of the mixer 57 so that, for example, the red color field R is supplied with 40%, the green color field G with 30%, and the blue color field B with 30% of the total current. In this way, the color hue can be adjusted continuously from red to blue via white.

In other respects, the circuit according to FIG. 9 is identical to that disclosed in connection with FIGS. 1 through 6.

The passenger of the vehicle can adjust any desired color hue between red and blue upon using the electroluminescent foils 19a. It is possible to configure only individual ones of the luminous fields in the vehicle such that they are illuminated in different color hues.

While specific embodiments of the invention have been shown and described in detail to illustrate the inventive principles, it will be understood that the invention may be embodied otherwise without departing from such principles.

What is claimed is:

1. An interior illumination system for a motor vehicle, said illumination system comprising one or more luminous fields (7–11, 16–18) formed by at least one light emitting, foil-shaped illumination panel (19) and configured to be connected to a voltage supply of the vehicle;
   wherein said luminous field (7–11, 16–18) is configured to adjust a hue of the emitted light by changing a supply voltage of said luminous field (7–11, 16–18); and
   wherein said luminous field (7–11, 16–18) is positioned behind a lining (22) of the vehicle interior.

2. The interior illumination system according to claim 1, wherein said lining (22) of the vehicle interior is comprised of a transparent textile material or a transparent foamed material.

3. The interior illumination system according to claim 1, wherein said luminous field (7–11, 16–18) is configured to adjust a light intensity thereof.

4. The interior illumination system according to claim 3 wherein said luminous field (7–11, 16–18) is configured to adjust said light intensity by changing a supply voltage of said luminous field (7–11, 16–18).

5. The interior illumination system according to claim 1, wherein said light emitting, foil-shaped illumination panel has a first side facing the vehicle interior and wherein said first side has at least one first transparent protective layer (20) comprised of a plastic material or glass.

6. The interior illumination system according to claim 5, wherein said light emitting foil-shaped illumination panel has a second side facing away from the vehicle interior and wherein said second side has at least one second transparent protective layer (21) comprised of a plastic material or glass.

7. The interior illumination system according to claim 1, wherein said luminous field (7–11, 16–18) is configured to be supplied with alternating voltage.

8. The interior illumination system according to claim 7, comprising at least one DC/AC converter (23) connected to said voltage supply of the vehicle and said luminous field (7–11, 16–18).

9. The interior illumination system according to claim 8, comprising at least one auxiliary converter (24–28, 54–56) connected to said DC/AC converter and said luminous field (7–11, 16–18).

10. The interior illumination system according to claim 9, wherein said auxiliary converter (24–28, 54–56) is configured to be dimmed and computer-controlled.

11. The interior illumination system according to claim 1, wherein said luminous field (7–11, 16–18) is configured to be switched on and off by an input device (34).

12. The interior illumination system according to claim 11, wherein several of said luminous fields (7–11, 16–18) are provided and wherein said luminous fields (7–11, 16–18) are configured to be switched on individually.

13. The interior illumination system according to claim 1, wherein said luminous field (7–11, 16–18) is configured to be switched on automatically based on surrounding light conditions.

14. The interior illumination system according to claim 1, wherein all of said luminous fields (7–11, 16–18) emit light of a same color.

15. The interior illumination system according to claim 14, wherein some of said luminous fields (7–11, 16–18) emit a different hue of said same color than the other ones of said luminous fields.

16. The interior illumination system according to claim 1, wherein said light emitting, foil-shaped illumination panel (19) is formed by an electroluminescent foil or a light-emitting polymer foil.

17. An interior illumination system for a motor vehicle, said illumination system comprising one or more luminous fields (7–11, 16–18) formed by at least one light emitting, foil-shaped illumination panel (19) and configured to be connected to a voltage supply of the vehicle, wherein said luminous field (7–11, 16–18) has several color fields (R, G, B, 50) and wherein said luminous field (7–11, 16–18) is configured to trigger said color fields selectively.

18. The interior illumination system according to claim 17, wherein said luminous field (7–11, 16–18) has discrete back electrodes (49) arranged on said front electrode (48) according to said color fields (R, G, B).

19. The interior illumination system according to claim 17, wherein said luminous field (7–11, 16–18) is configured to adjust a light intensity thereof by changing a supply voltage of said luminous field (7–11, 16–18).

20. An interior illumination system for a motor vehicle, said illumination system comprising one or more luminous fields (7–11, 16–18) formed by at least one light emitting, foil-shaped illumination panel (19) and configured to be connected to a voltage supply of the vehicle, wherein said luminous field (7–11, 16–18) has strip-shaped front electrodes (48) each having a strip-shaped color field (R, G, B), wherein said luminous field (7–11, 16–18) has strip-shaped back electrodes (49) arranged transversely to said front electrodes (48).

21. The interior illumination system according to claim 20, wherein said front electrodes (48) and said back electrodes (49) are configured to be individually triggered.

22. The interior illumination system according to claim 20, wherein said luminous field (7–11, 16–18) is configured to adjust a light intensity thereof by changing a supply voltage of said luminous field (7–11, 16–18).

23. An interior illumination system for a motor vehicle, said illumination system comprising one or more luminous fields (7–11, 16–18) formed by at least one light emitting, foil-shaped illumination panel (19) and configured to be connected to a voltage supply of the vehicle, wherein said luminous field (7–11, 16–18) has discrete color fields (R, G, B) and wherein said luminous field (7–11, 16–18) is configured to trigger said color fields (R, G, B) selectively.

24. The interior illumination system according to claim 23, wherein those ones of said color fields (R, G, B) having an identical color are connected to one another by a common electric line (51–53).

25. The interior illumination system according to claim 23, wherein said luminous field (7–11, 16–18) has a sheet-shaped front electrode (48) and wherein said color fields (R, G, B) are arranged on said front electrode (48).

26. The interior illumination system according to claim 23, wherein said luminous field (7–11, 16–18) is configured to adjust a light intensity thereof by changing a supply voltage of said luminous field (7–11, 16–18).

27. An interior illumination system for a motor vehicle, said illumination system comprising one or more luminous fields (7–11, 16–18) formed by at least one light emitting, foil-shaped illumination panel (19) and configured to be connected to a voltage supply of the vehicle, wherein at least one of said luminous fields (7–9) is configured to be fastened to a roof of the vehicle, and wherein the roof has transition areas to side windows of the vehicle and wherein at least one of said luminous fields (10, 11) is positioned in the transition area and has an elongate shape extending across a length of the roof toward the side windows.

28. The interior illumination system according to claim 27, wherein several of said luminous fields (7–9) cover the surface area of the roof.

29. The interior illumination system according to claim 27, wherein several of said luminous fields (7–9) cover the surface area of the roof at least preponderantly.

30. An interior illumination system for a motor vehicle, said illumination system comprising one or more luminous fields (7–11, 16–18) formed by at least one light emitting, foil-shaped illumination panel (19) and configured to be connected to a voltage supply of the vehicle, wherein at least one of said luminous fields (16, 17) is configured to be fastened to a side of a column of the vehicle facing the vehicle interior and extending between a rear window and a side window, wherein said at least one luminous field has a triangular contour.

31. An interior illumination system for a motor vehicle, said illumination system comprising one or more luminous fields (7–11, 16–18) formed by at least one light emitting, foil-shaped illumination panel (19) and configured to be connected to a voltage supply of the vehicle, wherein at least one of said luminous fields (18) is configured to be fastened to a side of a column of the vehicle facing the vehicle interior and extending between two side windows (3, 4; 5, 6).

* * * * *